(12) United States Patent
Ikenaka et al.

(10) Patent No.: US 9,548,560 B2
(45) Date of Patent: Jan. 17, 2017

(54) CONNECTOR

(71) Applicants: ITT MANUFACTURING ENTERPRISES, LLC, Wilmington, DE (US); ITT Cannon, Ltd., Zama-shi, Kanagawa (JP)

(72) Inventors: Kazuo Ikenaka, Zama (JP); Ryuichi Suzuki, Zama (JP)

(73) Assignees: ITT Manufacturing Enterprises, LLC, Wilmington, DE (US); ITT Cannon, Ltd. (JP)

( * ) Notice: Subject to any disclaimer, the term of this patent is extended or adjusted under 35 U.S.C. 154(b) by 0 days.

(21) Appl. No.: 14/687,968

(22) Filed: Apr. 16, 2015

(65) Prior Publication Data

US 2015/0222051 A1    Aug. 6, 2015

Related U.S. Application Data (63) Continuation of application No. PCT/JP2013/078390, filed on Oct. 18, 2013.

(30) Foreign Application Priority Data

Oct. 19, 2012   (JP) ................. 2012-232357

(51) Int. Cl.

| H01R 13/62 | (2006.01) |
|---|---|
| H01R 13/629 | (2006.01) |
| H01R 12/88 | (2011.01) |
| H01R 13/193 | (2006.01) |
| H01R 13/641 | (2006.01) |
| F16B 45/00 | (2006.01) |

(52) U.S. Cl.
CPC ............ *H01R 13/629* (2013.01); *H01R 12/88* (2013.01); *H01R 13/6295* (2013.01); *F16B 45/00* (2013.01);
(Continued)

(58) Field of Classification Search
CPC ... H01R 13/193; H01R 13/658; H01R 13/639; H01R 13/62933; H01R 13/6275; H01R 23/6806
(Continued)

(56) References Cited

U.S. PATENT DOCUMENTS 4,407,555 A * 10/1983 Lockard ............... H05K 7/1007
439/259
5,135,408 A * 8/1992 Suzuki ................. H01R 13/639
439/157
(Continued)

FOREIGN PATENT DOCUMENTS

| CN | 1359171 A | 7/2002 |
|---|---|---|
| JP | 2001-283982 | 10/2001 |

(Continued)

OTHER PUBLICATIONS

English translation of International Preliminary Report on Patentability for PCT/JP2013/078390 dated Apr. 30, 2015 (12 pages).
(Continued)

*Primary Examiner* — Hien Vu
(74) *Attorney, Agent, or Firm* — Harness, Dickey & Pierce, P.L.C.

(57) ABSTRACT

A plug engagement pin provided on each side of the plug connector is inserted into an engagement section of a hook and locked there when the shaft is rotated. The hook is fixed to a rotatable shaft provided for the receptacle connector and includes a projection. If the plug connector is inserted in a slanted state, the projection of the hook prevents the pin from being rotated.

9 Claims, 10 Drawing Sheets

(52) U.S. Cl.
CPC ....... *H01R 13/193* (2013.01); *H01R 13/62938* (2013.01); *H01R 13/62944* (2013.01); *H01R 13/641* (2013.01); *H01R 2201/12* (2013.01); *H01R 2201/20* (2013.01)

(58) Field of Classification Search
USPC ........................................ 439/261, 265, 372
See application file for complete search history.

(56) References Cited

U.S. PATENT DOCUMENTS

| | | | | |
|---|---|---|---|---|
| 5,676,556 | A | * | 10/1997 | Yamaguchi ...... H01R 13/62933 439/157 |
| 5,709,560 | A | * | 1/1998 | Hio .................. H01R 13/62933 439/157 |
| 6,679,712 | B2 | | 1/2004 | Chang |
| 6,679,714 | B2 | * | 1/2004 | Kimura .............. H01R 13/6581 439/261 |
| 2002/0064987 | A1 | | 5/2002 | Kimura |

FOREIGN PATENT DOCUMENTS

| | | |
|---|---|---|
| JP | 2002-170642 | 6/2002 |
| JP | 2004-31235 | 1/2004 |

OTHER PUBLICATIONS

International Search Report for PCT/JP2013/078390 (English translation included); mailed Nov. 12, 2013; 4 pp.
Notification of the First Office Action from the Chinese Patent Office mailed on Apr. 29, 2016 for corresponding China Application No. 201380054672.4 (with English translation) (15 pages).

* cited by examiner

CONNECTOR

CROSS-REFERENCE TO RELATED APPLICATIONS

This is a Continuation Application of PCT application NO. PCT/JP2013/078390, filed on Oct. 18, 2013, which was published under PCT Article 21 (2) in Japanese.

This application is based upon and claims the benefit of priority from prior Japanese Patent Application No. 2012-232357, filed Oct. 19, 2012, the entire contents of which are incorporated herein by reference.

BACKGROUND OF THE INVENTION

1. Field of the Invention

The present invention relates to a connector, such as a multicore connector used in medical equipment (e.g., an ultrasonic diagnosis apparatus) or industrial equipment (e.g., a semiconductor inspection apparatus) and capable of preventing a plug connector from being inserted slantwise in a receptacle connector and locked in that state.

2. Description of the Related Art

Figure 1:
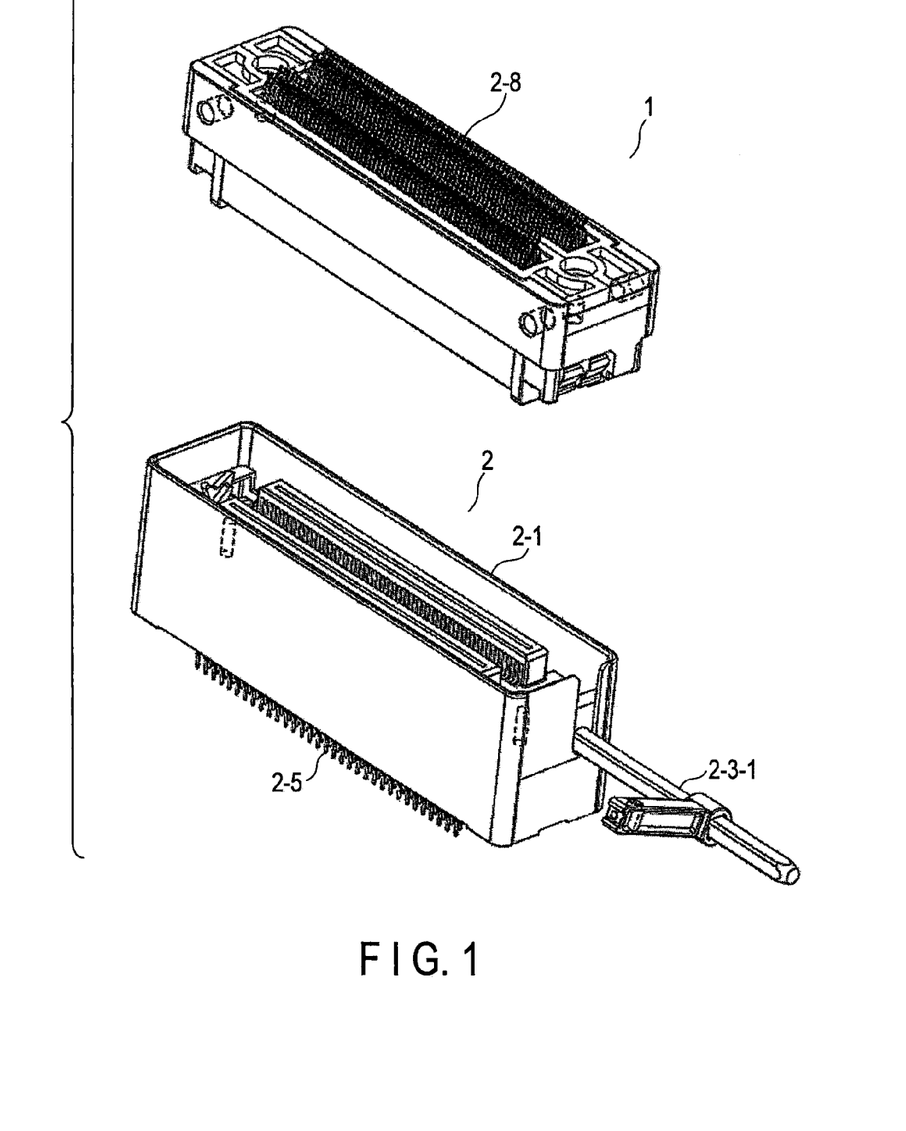
FIG. 1 is a view showing a plug connector 1 and a receptacle connector 2 according to the present invention.

When a conventional connector of, for example, zero force insertion (ZIF) type is used, a plug connector 1 is first inserted into a receptacle connector 2, as in the first embodiment shown in FIG. 1. In the state where the contacts 2-8 of the plug connector 1 are kept in contact with the corresponding contacts 2-5 of the receptacle connector 2, the plug connector 1 is further inserted into the receptacle connector 2, for establishing electrical connection. Then, the plug connector 1 and the receptacle connector 2 are locked, using proper locking means including a rotatable shaft 2-3-1.

Figure 10:
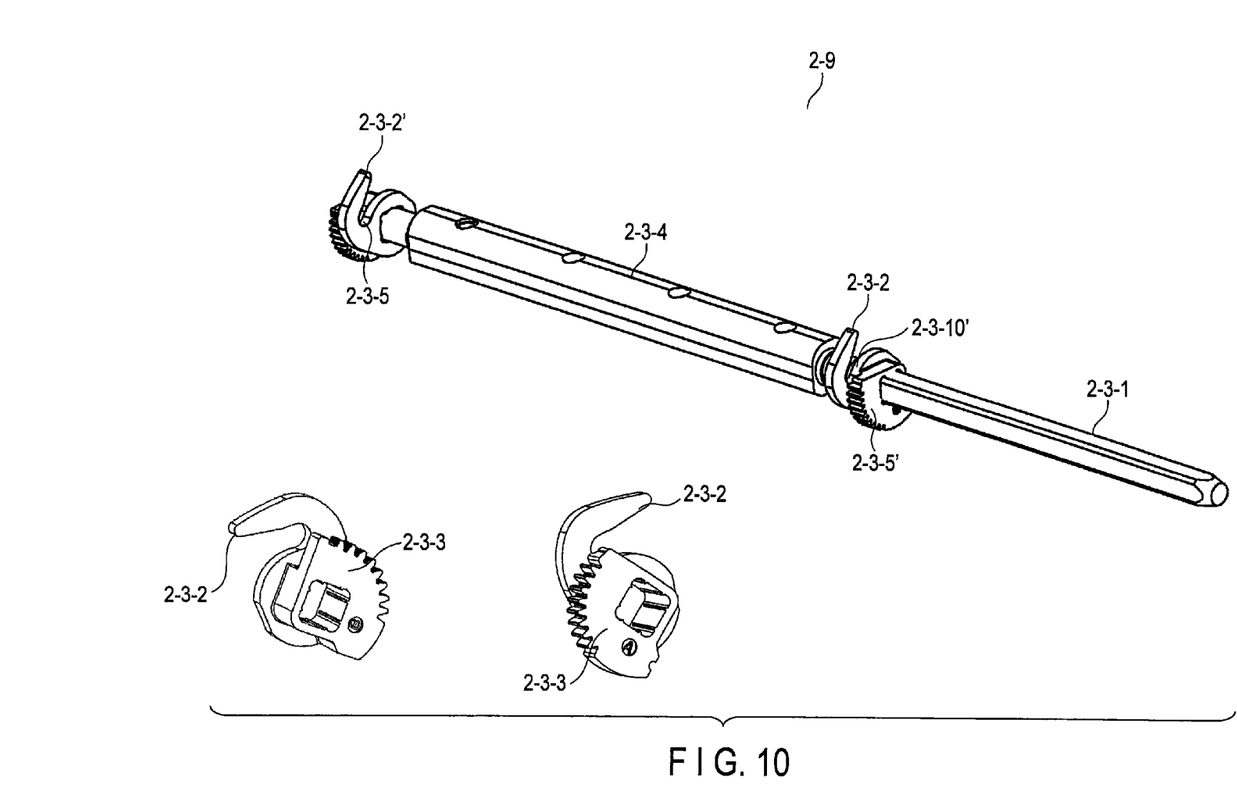
FIG. 10 shows a conventional type of shaft assembly.

FIG. 10 shows a shaft assembly 2-9 which is used for insertion and locking in the conventional art. The shaft assembly 2-9 is arranged on the receptacle connector 2. The shaft assembly 2-9 comprises a cam 2-3-4 used for the connection of the contacts of the receptacle connector 2, and a shaft 2-3-1 on which hooks 2-3-2 and 2-3-2' are coaxially arranged for locking the connectors.

Referring to FIG. 10, the shaft 2-3-1 is rotated clockwise until engagement pins 1-1, which are projections on the side portions of the plug connector 1, are moved into recesses 2-3-5 and 2-3-5', which define spaces into which the hooks 2-3-2 and 2-3-2' are guided and inserted. In this state, the contacts are connected, and the connectors are locked.

Figure 2:
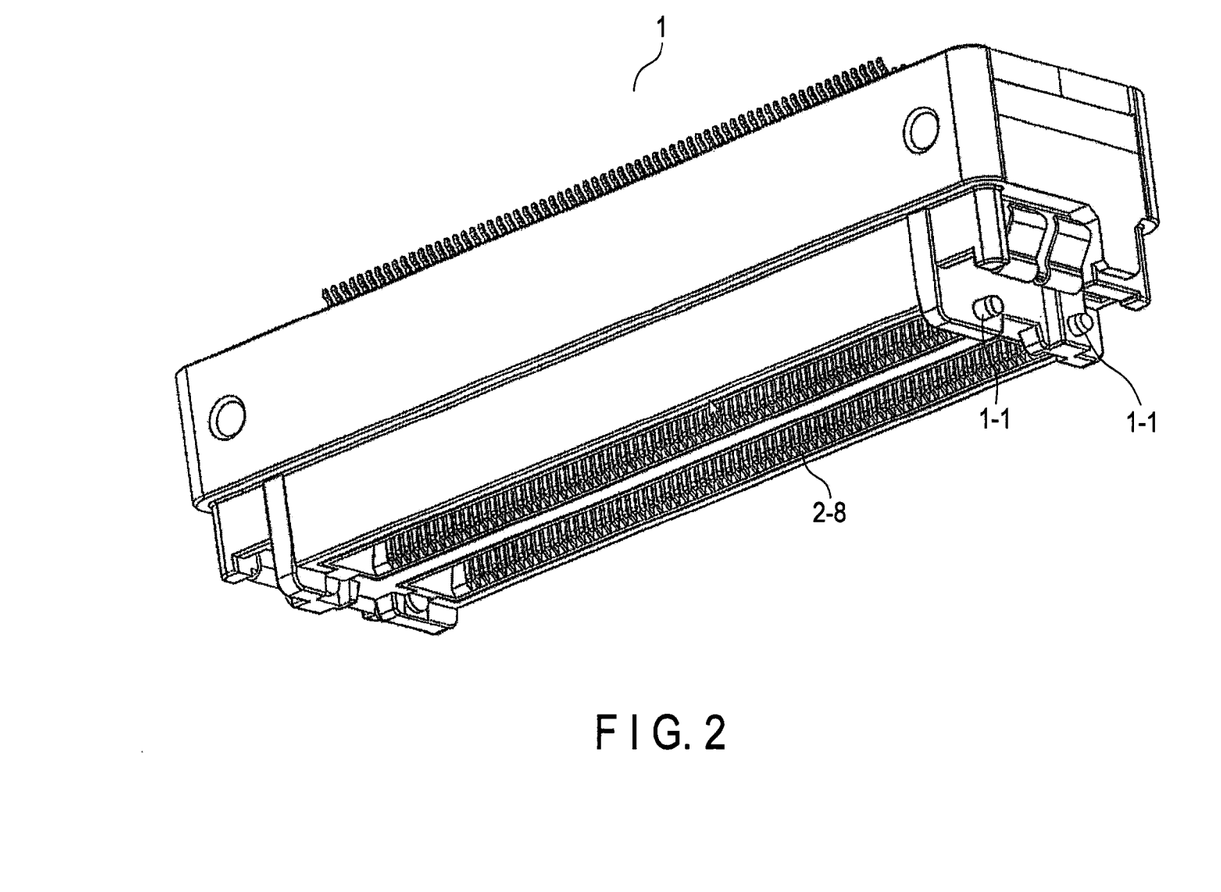
FIG. 2 is a view showing an engagement pin 1-1 provided for the plug connector 1.

Like the structure of the present invention shown in FIG. 2, this type of connecting and locking structure comprises engagement pins 1-1 on the side portions of the plug connector 1 (FIG. 2 shows engagement pins on one side portion only). The engagement pins 1-1 are projections which are brought into engagement with the hooks 2-3-2 formed on the shaft 2-3-1 of the receptacle connector 2. As shown in FIG. 10, the engagement hooks 2-3-2 and 2-3-2' are fixed to the respective sides of the shaft 2-3-1 of the receptacle connector 2, and are interlocked and rotated with the shaft 2-3-1 in the fitted state. By rotating the shaft 2-3-1 clockwise, the plug engagement pins 1-1 of the plug connector 1 of the plug connector 1 are inserted into the recesses 2-3-5 and 2-3-5' of the hooks 2-3-2 and 2-3-2' and locked there.

A related technique is shown in Jpn. Pat. Appln. KOKAI Publication No. 2004-31235.

BRIEF SUMMARY OF THE INVENTION

A description will now be given of a problem which may occur in the engagement operation of the conventional type of shaft assembly 10 shown in FIG. 10. Typically, the shaft 2-3-1 of the receptacle connector 2 shown in FIG. 10 is rotated clockwise in the state where the plug connector 1 is inserted into the receptacle connector 2 in parallel thereto. The hooks 2-3-2 and 2-3-2', which are fixed to the respective sides of the shaft 2-3-1 and rotatable together with the shaft 2-3-1, engage with the engagement pins 1-1 formed as projections on the side portions of the plug connector 1. As a result, the plug connector 1 is guided into the receptacle connector 2, and the plug connector 1 is locked in the receptacle connector 2 by the engagement between the engagement pins 1-1 and the recesses 2-3-5 of the hooks 2-3-2.

As can be seen from the above, the hooks 2-3-2 and 2-3-2' in the conventional art guide the engagement pins 1-1 of the plug connector 1 into the recesses 2-3-5 and 2-3-5' of the hooks and lock the engagement pins 1-1 there. Since the engagement pins 1-1 are used for locking, the recesses 2-3-5 of all the hooks 2-3-2 define such a curved shape as shown in FIG. 10, for example.

Figure 3:
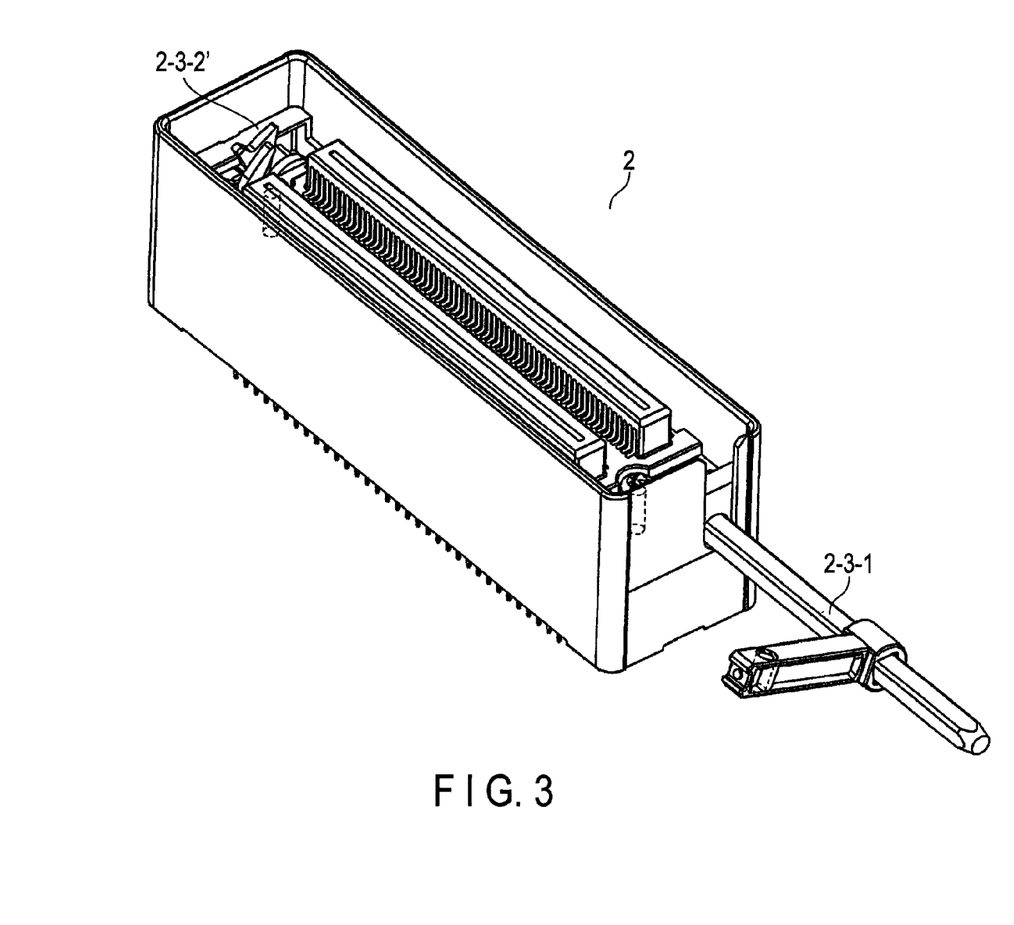
FIG. 3 is a view showing a hook 2-3-2' provided for the receptacle connector 2.

In the conventional art as well, as shown in FIG. 2 the lock engagement pins 1-1 are on the respective sides of the plug connector 1 (only the engagement pins on one side are shown in FIG. 2). FIG. 2 shows a multicore connector having two arrays of contacts. In the connector shown in FIG. 2, when the plug connector 1 is inserted, the engagement hooks 2-3-2, which are provided on the respective sides of the shaft 2-3-1 of the receptacle connector 2 and interlocked and rotated together with the shaft 2-3-1 (only the engagement hooks on one side are shown in FIG. 3) receive the engagement pins 1-1 of the plug connector 1 in their recesses and lock the engagement pins 1-1.

Where the shaft assembly 2-9 shown in FIG. 10 is used, however, and if the plug connector 1 is inserted slantwise with respect to the receptacle connector 2, and the shaft 2-3-1 of the receptacle connector is rotated, only the hook 2-3-2 on one side may engage with the engagement pin 1-1 of the plug connector 1, and the recess 2-3-5' of the hook 2-3-2' on the opposite side does not come into engagement with the corresponding engagement pin (not shown). The rotation of the shaft 2-3-1 may end even in this state.

To be more specific, the recess 2-3-5' of the hook 2-3-2' on the opposite side does not engage with the engagement pin 1-1, and the hook 2-3-2' is rotated under the engagement pin 1-1. In other words, the engagement pin 1-1 is locked only at the hook 2-3-6 on one side, while the other hook 2-3-6' remains unlocked, and the plug connector 1 is inserted slantwise. In this state, the plug connector 1 is electrically connected to part of the contacts 2-8 of the plug connector 1 and not to the remaining part of the contacts 2-8.

As described above, if the plug connector 1 is not horizontally fitted in the receptacle connector 2, only the engagement pins 1-1 on one side of the plug connector 1 are locked, while the engagement pins 1-1 on the other side (not shown) are not locked, permitting the shaft 2-3-1 to rotate. The fitting operation may be ended in such a condition. In this state, not all pins of the contacts 2-8 and 2-5 are connected, resulting in an error of a user application. The multicore connector is not necessarily located in front of a measuring apparatus or in the vicinity thereof, where it can be visually observed by the operator, so that the slanted insertion state may not be noticed by the measurer.

If the plug connector 1 is not horizontally fitted, as explained in connection with the conventional art, only the engagement pins 1-1 on one side of the plug connector must be prevented from being locked. If part of the pins are not locked, not all signals are supplied through the connector, resulting in the occurrence of an application error.

To solve this problem, the present invention provides a structure wherein a further projection is additionally provided on the hooks of the receptacle connector. If the plug connector is not completely inserted into the receptacle connector, the additionally provided projection strikes against the pin of the plug connector 1, and the shaft and the hooks cannot be rotated further.

One embodiment of the present invention provides a connector configured in such a manner that a plug connector including a plurality of contacts thereon is inserted into a receptacle connector including a plurality of corresponding contacts, at least one plug engagement pin provided on each side of the plug connector is inserted into an engagement section of a hook and locked there when the shaft is rotated, and the hook is fixed to a shaft provided for the receptacle connector and rotatable therewith. The hook is comprises the engagement section corresponding the at least one plug engagement pin. The connector is featured in that a projection is provided on the hook, and if the plug connector is not inserted into the receptacle connector in parallel thereto, the projection strikes against the at least one engagement pin, preventing the at least one hook and the shaft from being further rotated.

The receptacle connector may be provided with two shafts which are parallel to each other and each of which comprises at least one hook at each end. The two shafts are interlocked and rotated by a gear provided on the shaft.

In the connector provided with the two shafts, a projection may be provided on the at least one of the hooks at ends of each shaft.

The engagement section may be a recess formed in the at least one hook.

The connector may be a multicore connector of ZIF structure.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

FIG. 1 shows a multicore connector according to one embodiment. The multicore connector comprises a plug connector 1, and a receptacle connector 2 which is provided with a shaft 2-3-1 used for locking. The connector according to the embodiment is suitably applicable to a multicore connector for connecting contacts 2-8 and contacts 2-5 which are used for the wiring connection of a measuring apparatus or an inspection apparatus. The plug connector 1 is inserted into the housing 2-1 of the receptacle connector 2. The plug connector 1 is guided to the fixing position inside the receptacle connector 2 by a guide means (to be described below), in order to establish electrical connection between the contacts 2-8 of the plug connector 1 and the corresponding contacts 2-5 of the receptacle connector 2.

FIG. 1 shows an embodiment wherein a plurality of contacts are arranged in two arrays. The contacts may be arranged in a single array or in two or more arrays. When shaft 2-3-1 is rotated, shaft 2-3-1' is also rotated by interlocking gears 2-3-3 and 2-3-3', such as those shown in FIG. 4. As a result, the hooks 2-3-2 and 2-3-2' including a portion constituting an engagement section are rotated, so that the plug connector 1 is guided and locked with respect to the receptacle connector 2.

In the present invention, the plug connector 1 is prevented from being inserted slantwise and locked with respect to the receptacle connector 2. In other words, the plug connector 1 and the receptacle connector 2 in a slanted state cannot be fitted or locked.

Figure 5:
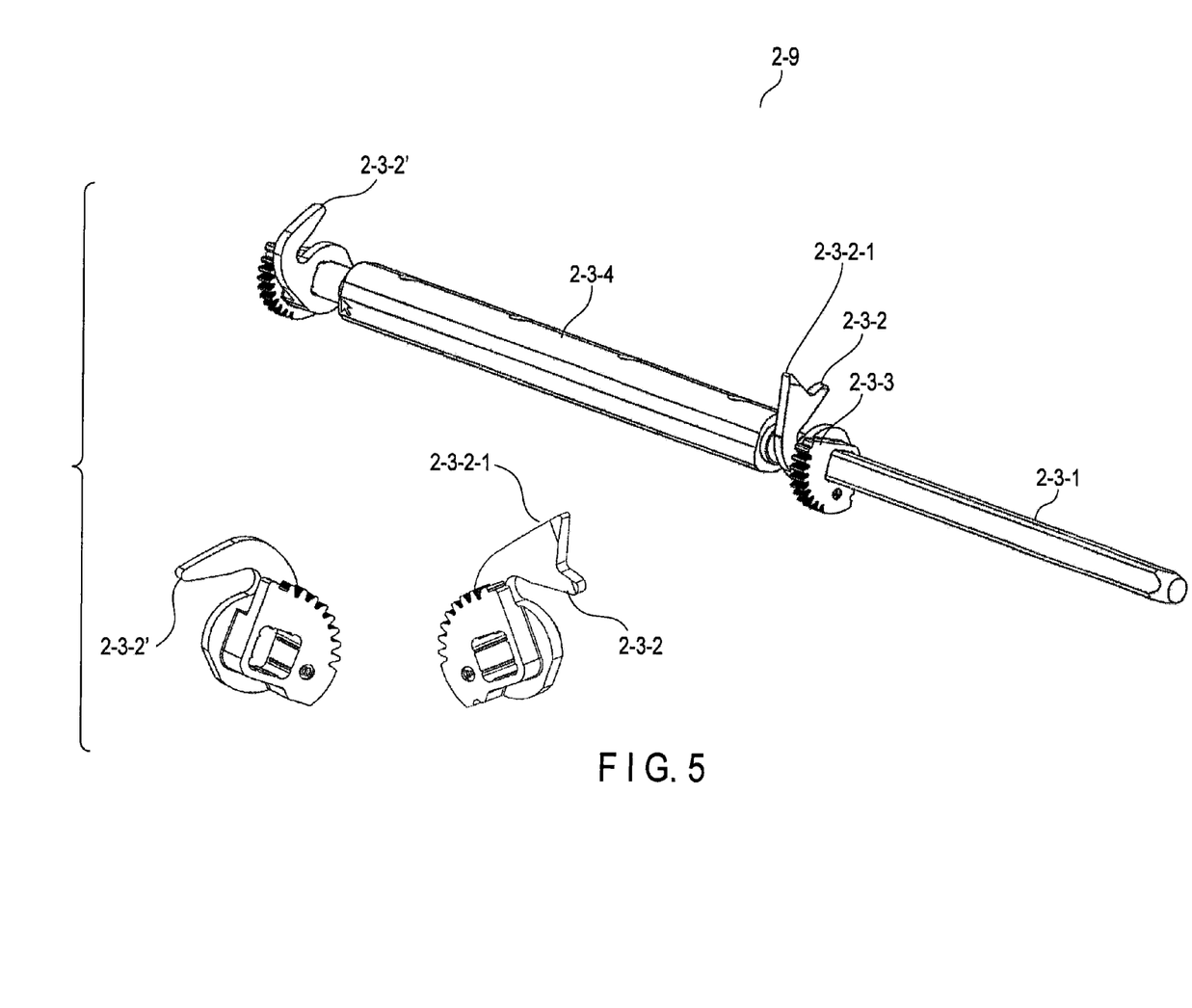
FIG. 5 is a view showing a shaft assembly of the receptacle connector 2 according to the present invention.

As shown in FIG. 5, a projection 2-3-2-1 is additionally formed on hook 2-3-2. If the plug connector 1 is not completely inserted, the projection 2-3-2-1 strikes against the pin 11 of the plug connector 1, and the hook is not rotated further. Preferably, the position where the projection 2-3-2-1 is formed is on the upper portion of the hook 2-3-2. The projection 2-3-2-1 may be formed in a step different from that in which the hook 2-3-2 is formed; alternatively, the projection 2-3-2-1 may be integrally formed with the hook 2-3-2 as one piece.

FIG. 2 shows engagement pins 1-1 provided for the plug connector 1 of the embodiment and serving as guide means. The engagement pins 1-1 are guided downward by guide means (such as hook 2-3-2 shown in FIG. 4) provided for the receptacle connector 2. As a result, the plug connector 1 is guided to the fixing position inside the receptacle connector 2.

FIG. 3 shows the receptacle connector 2 and a hook 2-3-2' formed on the shaft 2-3-1 arranged in the receptacle connector 2.

Figure 4:
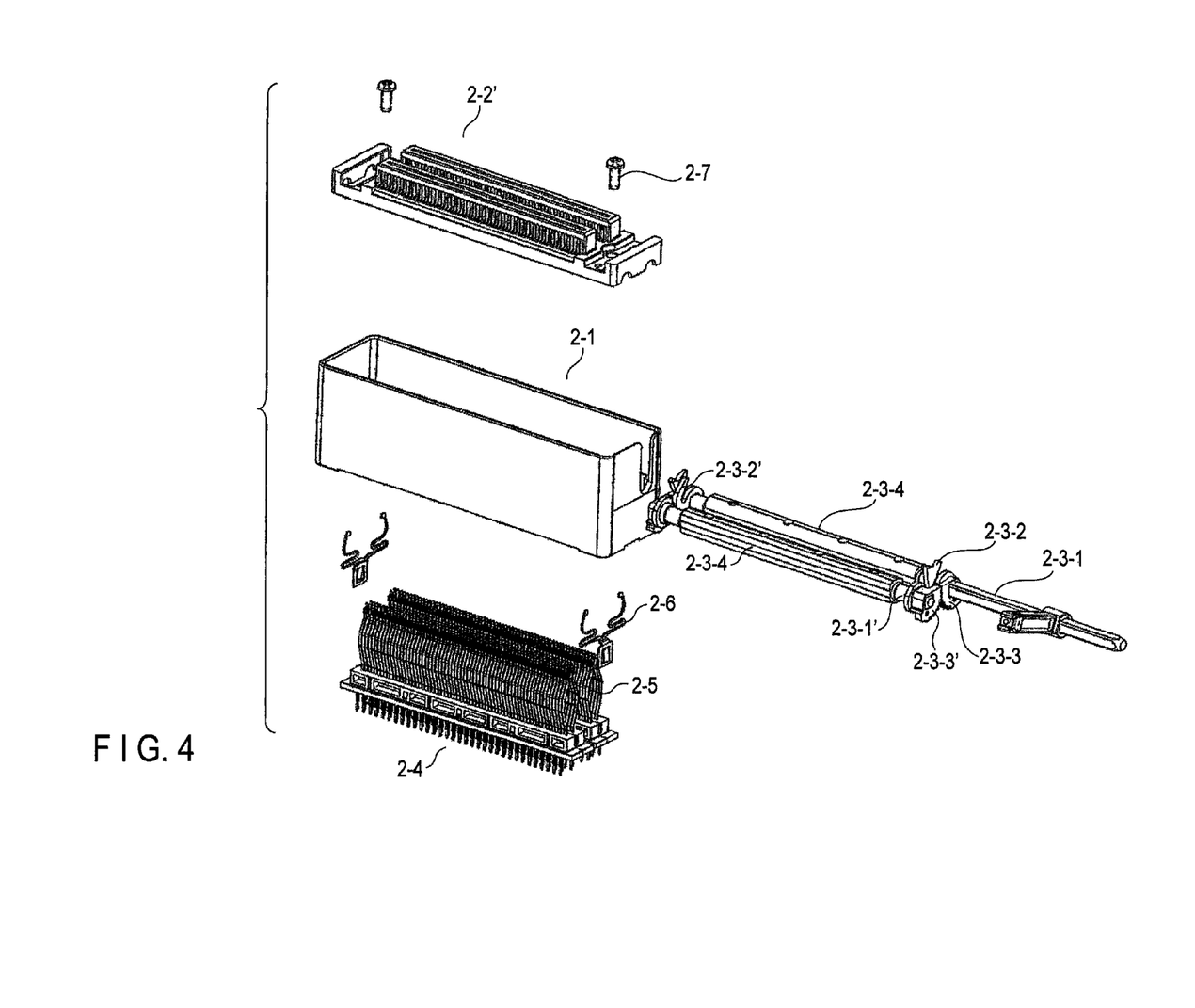
FIG. 4 is an exploded view of the receptacle connector 2.

FIG. 4 is an exploded view showing the receptacle connector 2 of the embodiment of the present invention. The receptacle connector shown in FIG. 4 comprises a housing 2-1, an insulator 2-2 arranged inside the housing 2-1, shafts 2-3-1 and 2-3-1', and contact module 2-4. The insulator 2-2, used for properly arranging contacts 2-5, is attached to the housing 2-1 by means of screws 2-7 for insulator attachment. The receptacle contacts 2-5 and ground springs 2-6 are attached to the contact module 2-4.

The receptacle connector 2 shown in FIG. 4 is an example in which a plurality of connectors is arrangement in two rows. For this reason, two shafts 2-3-1 and 2-3-1' are used. In the present embodiment, the hooks 2-3-2 and 2-3-2', are fixed to each shaft, and only the shaft on one side has a projection. Shafts 2-3-1 and 2-3-1' are interlocked and rotated in parallel to each other by means of gears 2-3-3 and 2-3-3'. The hooks 2-3-2 and 2-3-2' in an opposed state are rotated and engage with the corresponding engagement pins 1-1 (FIG. 2) of the plug connector 1. A projection 2-3-2-1 is provided on at least the hook on one side of the shaft, as shown in FIG. 4. With this structure, if the plug connector is not completely inserted, the projection strikes against the pin of the plug connector, and the hooks cannot be rotated further. Reference numerals 2-3-4 and 2-3-4' denote cams for the contacts.

FIG. 5 shows a shaft assembly 2-9 of the receptacle connector 2 pertaining to the embodiment of the present invention, and the hook 2-3-2 on which the projection 2-3-2-1 is formed. According to the embodiment, the projection 2-3-2-1 is formed only on the hook 2-3-2 on the right side as viewed in FIG. 5, and no projection is formed on the hook 2-3-2' on the left side. Needless to say, a projection may be formed on each hook.

Figure 9:
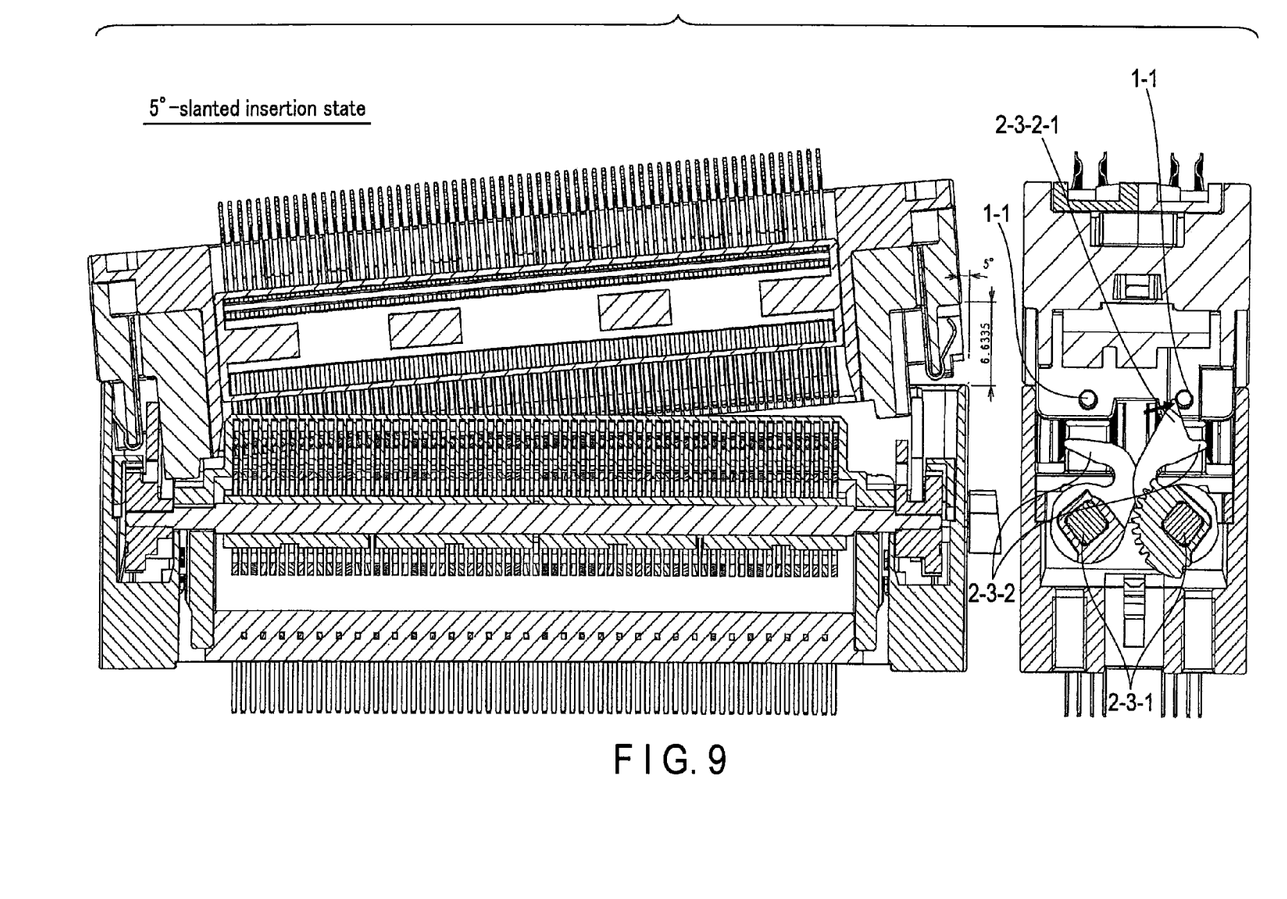
FIG. 9 illustrates the state where the plug connector 1 is inserted into the receptacle connector 2 at a slant angle of 5°.

The receptacle connector 2 wherein projection 2-3-2-1 is formed on hook 2-3-3 does not permit the shaft 2-3-1 of the receptacle connector 2 to be rotated in a slanted state since in this state, the projection 2-3-2-1 on the hook 2-3-2 of the receptacle connector 2 strikes against the engagement pin 1 of the plug connector 1-1, as shown in FIG. 9. Since the user can readily understand the insertion state is incomplete, it is possible to prevent an incomplete fitted state.

FIG. 5 shows an example of a shaft wherein projection 2-3-2-1 is formed only on the hook 2-3-2 on the right side as viewed in FIG. 5. Alternatively, a projection may be formed only on hook 2-3-2' on the left side. Furthermore, a projection may be formed on both hooks 2-3-2 and 2-3-2'. As can be seen, it is only required that a projection is formed on at least one hook.

In the lower left portion of FIG. 5, (a) a hook on which projection 2-3-2-1 is formed, and (b) a hook on which no projection is formed, are shown.

Figure 6:
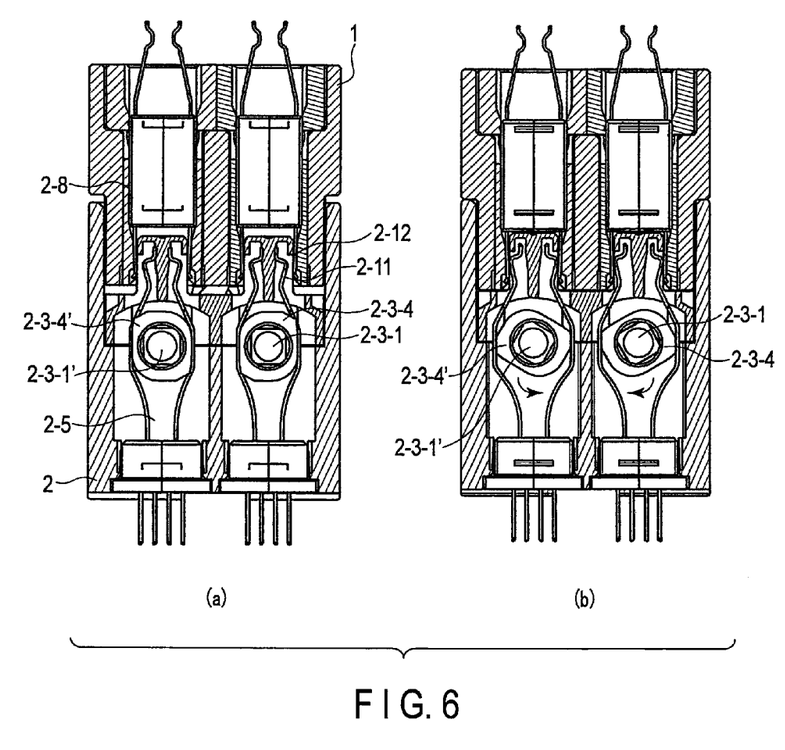
FIG. 6 shows sectional views illustrating how the plug connector 1 and the receptacle connector 2 are coupled to each other.

FIG. 6 shows cross sections illustrating how the contact 2-5 of the receptacle 2 and the contact 2-8 of the plug connector 1 are electrically connected to each other when the shafts 2-3-1 and 2-3-1' are rotated. Cross section (a) in FIG. 6 shows the state where shaft 2-3-1 and cam 2-3-4 are not rotated and contacts 2-5 and contacts 2-8 are out of contact. Cross section (b) shows the state where the shaft and cam are rotated and contacts 2-5 and contacts 2-8 are in contact. Shaft 2-3. When the cam is rotated, its large diameter portion (e.g., the diagonal portion shown in FIG. 6) moves to a horizontal position, widening the receptacle contact 2-5. As a result, the upper end portion 2-11 permits the plug contact 2-5 to come into contact with the plug contact 2-8.

Figure 7:
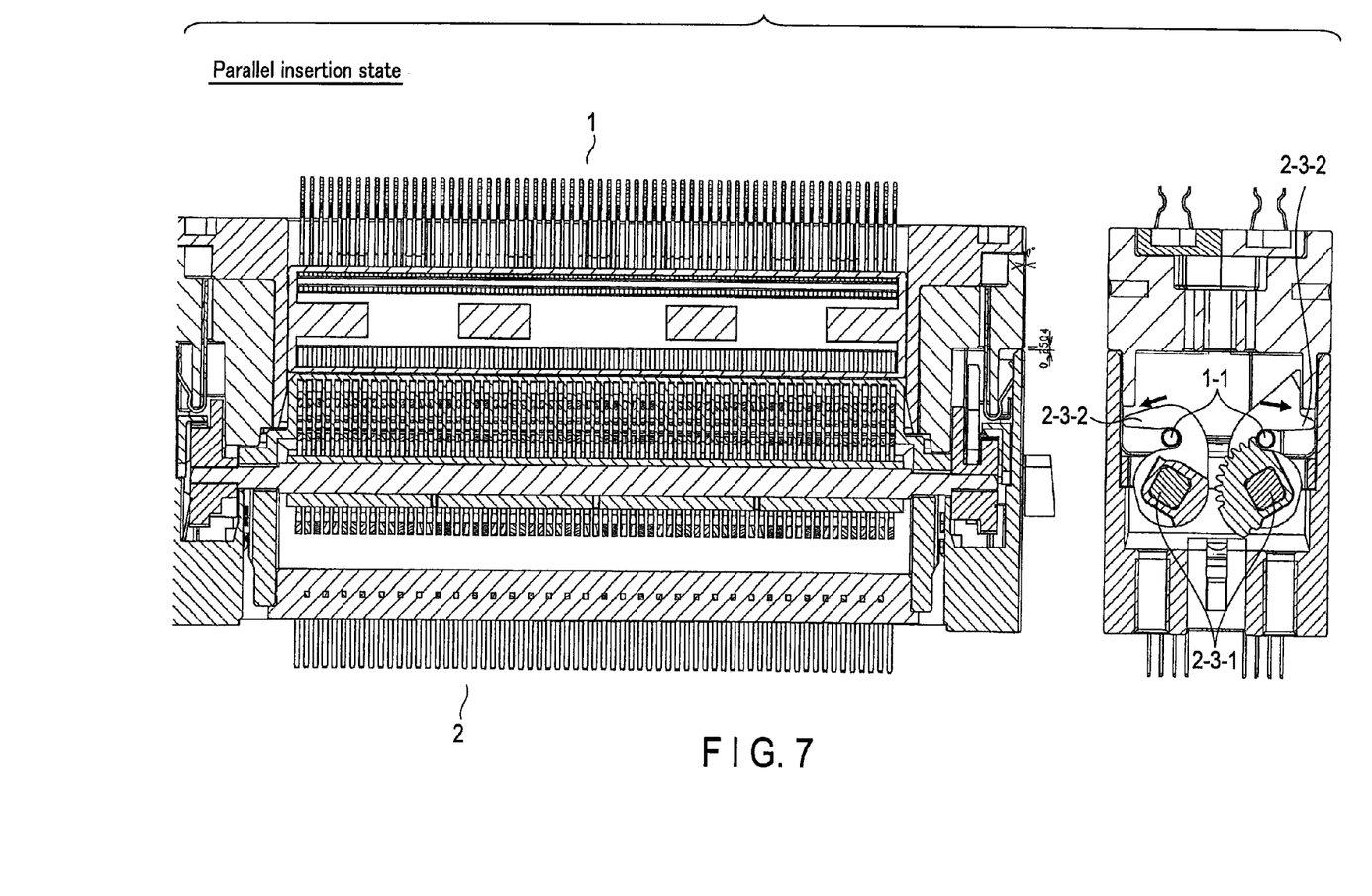
FIG. 7 illustrates the state where the plug connector 1 is inserted into the receptacle connector 2 in parallel thereto.
Figure 8:
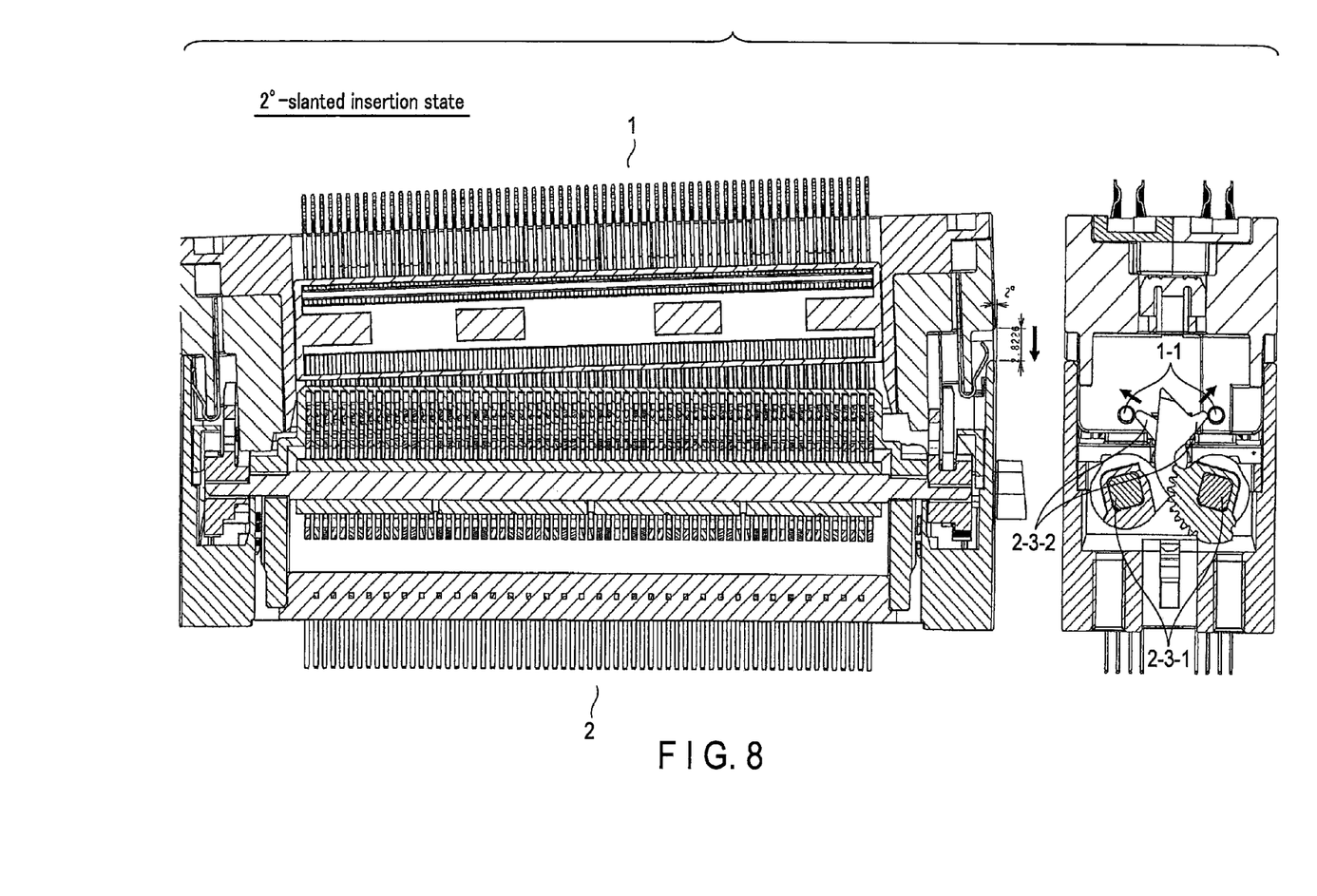
FIG. 8 illustrates the state where the plug connector 1 is inserted into the receptacle connector 2 at a slant angle of 2°.

FIGS. 7-9 are cross sections illustrating how the connector of the embodiment operates (i.e., the connector in which contacts are arranged in two arrays).

FIG. 7 illustrates the normal fitted state, i.e., the state where the plug connector 1 is inserted into the receptacle connector in parallel therewith. In the state shown in FIG. 7 (normal fitted state), the hooks 2-3-2 of the receptacle connector 2 are rotated together with the shafts 2-3-1 relative to the engagement pins 1-1 of the plug connector 1, and the plug pin is guided and locked.

FIG. 8 shows cross sections illustrating the case where the plug connector is inserted in the slanted state at an angle of 2°. In this state, the distal ends of the hooks 2-3-2 guide the engagement pins 1-1 of the plug connector 1 downward. When the shafts 2-3-1 are rotated, the plug connector 1 is guided as in the normal fitted shown in FIG. 7, and the plug connector 1 and the receptacle connector 2 are made parallel to each other, resulting in a properly fitted lock state.

FIG. 9 shows cross sections illustrating the case where the plug connector 1 is inserted into the receptacle connector 2 in the slanted state at an angle of 5°. In this state, the projection 2-3-2-1 of the hook 2-3-2 strikes against the engagement pin 1-1 of the plug connector 1, preventing the shaft from rotating. Therefore, the plug connector is not fitted or locked.

Since the plug connector 1 cannot be fitted or locked in a slanted state, an incomplete fitted condition does not occur.

Although an embodiment of the present invention has been described above, various modifications can be made without departing from the technical range of the present invention. In other words, the present invention is not limited to the embodiment described above and can be modified in various manners when it is reduced to practice. Furthermore, the above embodiment includes inventions of various stages, and various inventions can be extracted by combining the structural elements disclosed in the present application.

What is claimed is:

1. A connector comprising:
   a plug connector including a housing, a plurality of contacts in the housing and at least one engagement pin provided on each side of the plug connector; and
   the plug connector fitted into a receptacle connector, the receptacle including a housing, a plurality of contacts corresponding to the plurality of contacts in the plug connector; a rotatable shaft fitted in the housing; a least one hook fixed to the shaft, wherein the hook includes an engagement section corresponding to the engagement pin, wherein the engagement section is configured to lock onto the engagement pin when the plug connector is inserted into the receptacle connector and the shaft is rotated; and a projection extending outward from a side of the hook and in opposed direction with the hook, wherein if the plug connector is not fitted into the receptacle connector in a state that the plug connector is parallel to the receptacle connector such that the engagement section cannot properly engage the engagement pin and the projection strikes against the engagement pin, the projection preventing the hook and the shaft from being rotated further.

2. The connector according to claim 1, wherein the receptacle connector comprises two shafts which are parallel to each other and each of which comprises at least one hook at each end, the two shafts being interlocked and rotated by a gear provided on the shaft.

3. The connector according to claim 2, wherein the projection is provided on the at least one of the hooks at ends of each shaft.

4. The connector according to claim 1, wherein the engagement section is a recess formed in the at least one hook.

5. The connector according to claim 2, wherein the engagement section is a recess formed in the at least one hook.

6. The connector according to claim 3, wherein the engagement section is a recess formed in the at least one hook.

7. The according to claim 1, wherein the connector is a multicore connector of ZIF structure.

8. The according to claim 2, wherein the connector is a multicore connector of ZIF structure.

9. The according to claim 3, wherein the connector is a multicore connector of ZIF structure.

* * * * *